United States Patent
Jain et al.

(10) Patent No.: US 10,304,335 B2
(45) Date of Patent: May 28, 2019

(54) DETECTING AVAILABLE PARKING SPACES

(71) Applicant: Ford Global Technologies, LLC, Dearborn, MI (US)

(72) Inventors: Jinesh J Jain, San Mateo, CA (US); Sneha Kadetotad, Sunnyvale, CA (US); Harpreetsingh Banvait, Sunnyvale, CA (US); Vidya Nariyambut Murali, Sunnyvale, CA (US); Peter Gyumyeong Joh, Bloomfield Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 89 days.

(21) Appl. No.: 15/096,803

(22) Filed: Apr. 12, 2016

(65) Prior Publication Data

US 2017/0294121 A1     Oct. 12, 2017

(51) Int. Cl.
*G08G 1/14*     (2006.01)
*G01S 7/41*     (2006.01)
(Continued)

(52) U.S. Cl.
CPC ............... *G08G 1/14* (2013.01); *G01S 7/417* (2013.01); *G01S 13/91* (2013.01); *G01S 13/931* (2013.01);
(Continued)

(58) Field of Classification Search
CPC ....... G08G 1/096725; G08G 1/096805; G08G 1/16; G08G 1/165; G05D 2201/0213;
(Continued)

(56) References Cited

U.S. PATENT DOCUMENTS

| 5,345,402 A | 9/1994 | Gioutsos |
| 7,099,796 B2 | 8/2006 | Hamza |

(Continued)

FOREIGN PATENT DOCUMENTS

| EP | 2148220 A1 | 1/2010 |
| WO | WO-201019045 A1 | 2/2010 |

(Continued)

*Primary Examiner* — James J Yang
*Assistant Examiner* — Kevin Lau
(74) *Attorney, Agent, or Firm* — David R. Stevens; Stevens Law Group

(57) ABSTRACT

The present invention extends to methods, systems, and computer program products for detecting available parking spaces in a parking environment. Radar systems are utilized to gather data about a parking lot environment. The radar data is provided to a neural network model as an input. Algorithms employing neural networks can be trained to recognize parked vehicles and conflicting data regarding debris, shopping carts, street lamps, traffic signs, pedestrians, etc. The neural network model processes the radar data to estimate parking space boundaries and to approximate the parking space boundaries as splines. The neural network model outputs spline estimations to a vehicle computer system. The vehicle computer system utilizes the spline estimates to detect available parking spaces. The spline estimates are updated as the vehicle navigates the parking environment.

20 Claims, 4 Drawing Sheets

(51) Int. Cl.
*G01S 13/91* (2006.01)
*G01S 13/93* (2006.01)
*G06K 9/00* (2006.01)
*G01S 7/295* (2006.01)
*G01S 13/90* (2006.01)

(52) U.S. Cl.
CPC ......... *G06K 9/00812* (2013.01); *G08G 1/143* (2013.01); *G08G 1/146* (2013.01); *G08G 1/147* (2013.01); *G01S 7/295* (2013.01); *G01S 13/90* (2013.01); *G01S 2013/9314* (2013.01); *G01S 2013/9375* (2013.01)

(58) Field of Classification Search
CPC ............... G05D 1/0088; G05D 1/0212; G06K 9/00791; G01S 17/936; G01S 13/86; G01S 13/867; G01S 13/87; G01S 2013/9342; G01S 2013/9346; G01S 2013/935
See application file for complete search history.

(56) References Cited

U.S. PATENT DOCUMENTS

| | | | |
|---|---|---|---|
| 7,447,593 B2 | 11/2008 | Estkowski | |
| 7,579,942 B2 | 8/2009 | Kalik | |
| 7,839,292 B2 | 11/2010 | Wang | |
| 8,655,537 B2 | 2/2014 | Ferguson | |
| 9,098,753 B1 | 8/2015 | Agarwal | |
| 9,221,461 B2 | 12/2015 | Ferguson | |
| 2005/0035879 A1* | 2/2005 | Gotzig | B60Q 9/006 340/932.2 |
| 2005/0225439 A1 | 10/2005 | Watanabe | |
| 2007/0055446 A1* | 3/2007 | Schiffmann | G01S 7/4026 701/301 |
| 2008/0177443 A1* | 7/2008 | Lee | B62D 15/0285 701/41 |
| 2009/0015389 A1 | 1/2009 | Seehaus et al. | |
| 2010/0253594 A1* | 10/2010 | Szczerba | G01S 13/723 345/7 |
| 2014/0347196 A1 | 11/2014 | Schulz | |
| 2015/0344028 A1* | 12/2015 | Gieseke | B60W 30/00 701/1 |
| 2016/0180530 A1* | 6/2016 | Friend | G01S 7/4808 382/103 |
| 2017/0076019 A1 | 3/2017 | Nallapa | |
| 2017/0109928 A1 | 4/2017 | Micks | |
| 2017/0132334 A1 | 5/2017 | Levinson | |
| 2017/0148168 A1 | 5/2017 | Lindner | |
| 2017/0213070 A1 | 7/2017 | Aghamohammadi | |
| 2017/0262768 A1 | 9/2017 | Nowozin | |
| 2018/0098052 A1 | 4/2018 | Black | |

FOREIGN PATENT DOCUMENTS

| | | |
|---|---|---|
| WO | WO-201593853 A1 | 6/2015 |
| WO | WO-2017157967 A1 * | 9/2017 |

* cited by examiner

DETECTING AVAILABLE PARKING SPACES

CROSS-REFERENCE TO RELATED APPLICATIONS

Not applicable.

BACKGROUND

1. Field of the Invention

This invention relates generally to the field of parking space detection systems, and, more particularly, to radar-based detection systems that can detect available parking spaces in a parking environment.

2. Related Art

Parking can be a cumbersome process for a human driver. In the case of perpendicular parking or angle parking, it can be difficult to estimate when to turn in to a parking space, if there is going to be enough room on both sides of the vehicle, how to position the steering wheel such that the vehicle is equally spaced between the parking lines, and how far to pull into a parking space. In the case of parallel parking, it can be difficult to know if there is sufficient space to park a vehicle, when to start turning the steering wheel, and how far to pull into a space before correcting the steering wheel. These parking maneuvers can be further complicated in the presence of uneven terrain or in the presence of moving objects such as pedestrians, bicyclists, or other vehicles.

BRIEF DESCRIPTION OF THE DRAWINGS

The specific features, aspects and advantages of the present invention will become better understood with regard to the following description and accompanying drawings where.

DETAILED DESCRIPTION

Figure 1:
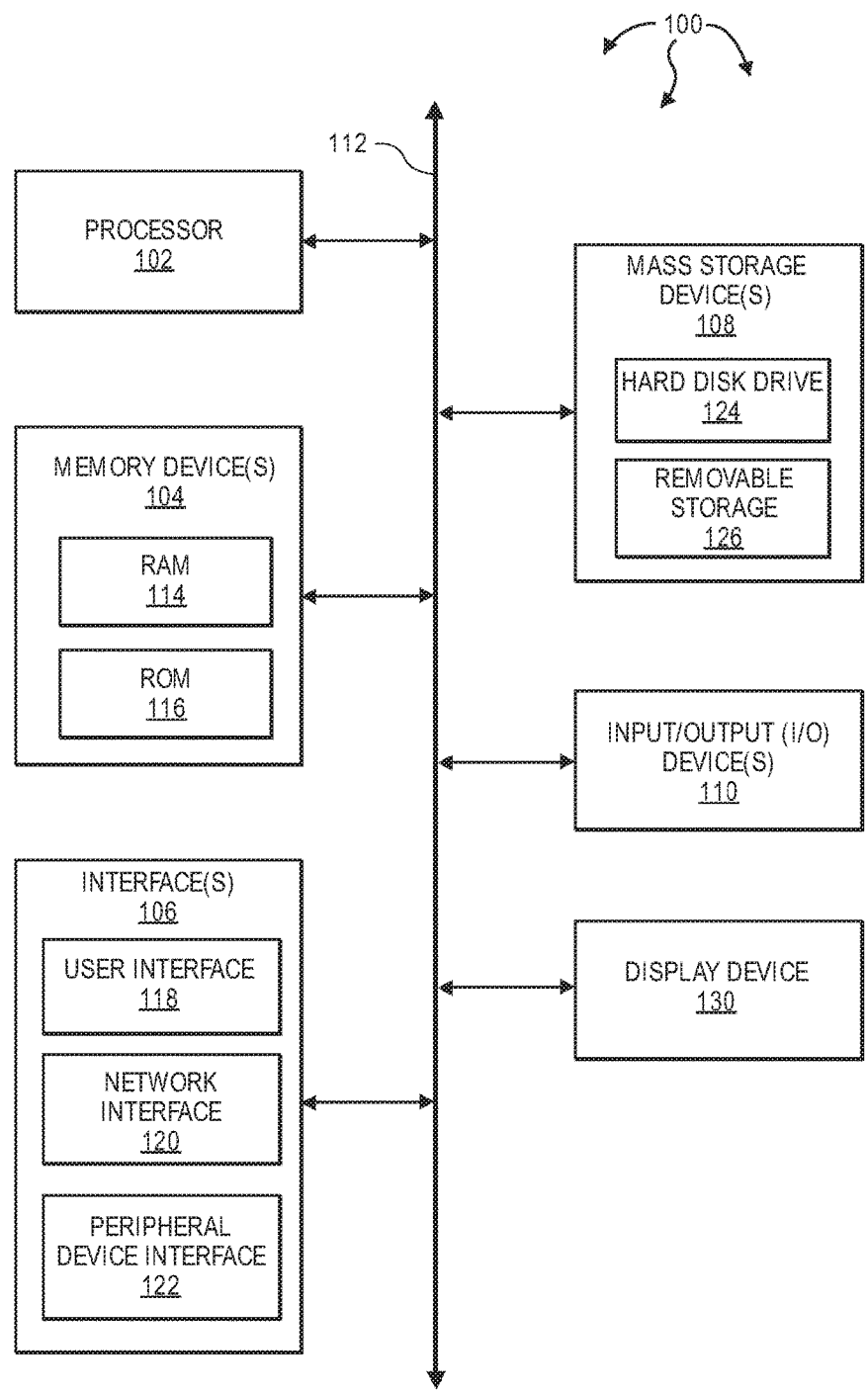
FIG. 1 illustrates an example block diagram of a computing device.

The present invention extends to methods, systems, and computer program products for detecting available parking spaces in a parking environment.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. RAM can also include solid state drives (SSDs or PCIx based real time memory tiered Storage, such as FusionIO). Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention can also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service (SaaS), Platform as a Service (PaaS), Infrastructure as a Service (IaaS), and deployment models (e.g., private cloud, community cloud, public cloud, hybrid cloud, etc.). Databases and servers described with respect to the present invention can be included in a cloud model.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the following description and Claims to refer to particular system components. As one skilled in the art will appreciate, components may be referred to by different names. This document does not intend to distinguish between components that differ in name, but not function.

In this specification and the following claims, a "spline" is defined as a numeric function that is piecewise-defined by polynomial functions. A spline can include a relatively high degree of smoothness at the places where the polynomial pieces connect. A spline is defined to include any of: a Bezier curve, a Hermite spline, a cubic spline, a b-spline, a non-uniform rational b-spline (NURB), a beta-spline, a v-spline, etc.

In this specification and the following claims, "spline data" is defined as any data related to calculating a solution to the polynomial functions included in a numeric function for a spline.

In one aspect, one or more processors are configured to execute instructions (e.g., computer-readable instructions, computer-executable instructions, etc.) to perform any of a plurality of described operations. The one or more processors can access information from system memory and/or store information in system memory. The one or more processors can transform information between different formats, such as, for example, radar data, coordinate data, spline data, etc.

System memory can be coupled to the one or more processors and can store instructions (e.g., computer-readable instructions, computer-executable instructions, etc.) executed by the one or more processors. The system memory can also be configured to store any of a plurality of other types of data generated by the described components, such as, for example, radar data, coordinate data, spline data, etc.

Automated parking is one of the promising aspects of automated driving. Some vehicles already offer the ability to automatically execute a parallel parking maneuver. Solutions to automated parking are envisioned to be easily automated with high degrees of safety and repeatability. However the success of these solutions depends very highly on robustly estimating parking spaces early on.

In general, aspects of the invention can be used for detecting available parking spaces in a parking environment, such as, for example, in a parking lot. As used herein, a "parking environment" includes any type of area in which one or more vehicles can be parked, such as a parking lot, parking garage, parking structure, parking area, and the like. Radar sensors on a vehicle are utilized to gather data about a parking environment, such as, for example, a parking lot. The radar detection data is provided to a neural network model as an input. Algorithms employing neural networks can be trained to recognize parked vehicles and conflicting data regarding debris, shopping carts, street lamps, traffic signs, pedestrians, etc. The neural network model processes the radar detection data to estimate parking space boundaries and to approximate the parking space boundaries as splines. The neural network model outputs the spline estimations to the vehicle computer system. The vehicle computer system utilizes the spline estimates to detect available parking spaces. The spline estimates are updated as the vehicle navigates the parking lot.

FIG. 1 illustrates an example block diagram of a computing device 100. Computing device 100 can be used to perform various procedures, such as those discussed herein. Computing device 100 can function as a server, a client, or any other computing entity. Computing device 100 can perform various communication and data transfer functions as described herein and can execute one or more application programs, such as the application programs described herein. Computing device 100 can be any of a wide variety of computing devices, such as a mobile telephone or other mobile device, a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer storage media, such as cache memory.

Memory device(s) 104 include various computer storage media, such as volatile memory (e.g., random access memory (RAM) 114) and/or nonvolatile memory (e.g., read-only memory (ROM) 116). Memory device(s) 104 may also include rewritable ROM, such as Flash memory.

Mass storage device(s) 108 include various computer storage media, such as magnetic tapes, magnetic disks, optical disks, solid state memory (e.g., Flash memory), and so forth. As depicted in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, barcode scanners, microphones, monitors or other display devices, speakers, printers, network interface cards, modems, cameras, lenses, radars, CCDs or other image capture devices, and the like.

Display device 130 includes any type of device capable of displaying information to one or more users of computing device 100. Examples of display device 130 include a monitor, display terminal, video projection device, and the like.

Interface(s) 106 include various interfaces that allow computing device 100 to interact with other systems, devices, or computing environments as well as humans. Example interface(s) 106 can include any number of different network interfaces 120, such as interfaces to personal area networks (PANs), local area networks (LANs), wide area networks (WANs), wireless networks (e.g., near field communication (NFC), Bluetooth, Wi-Fi, etc., networks), and the Internet. Other interfaces include user interface 118 and peripheral device interface 122.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

Aspects of the invention can be used for detecting available parking spaces in a parking environment, such as, for example, a parking lot. A deep, learning-based technique that can replace existing fitting and regression-type techniques can be utilized. The deep learning-based technique can achieve stable, free-space boundary estimation in a parking environment. The technique can be real-time, work on fewer points, and therefore provide a moving boundary estimate instantaneously. The approach can also be more scalable, as the hidden layers of a deep neural network can be trained to learn and overcome the idiosyncrasies of the radar spurious reflections.

Generally, a vehicle (e.g., a test vehicle) equipped with multiple radar units (e.g., 4 corner radar units) can navigate a parking environment (e.g., a parking lot) searching for parking spaces. As the vehicle moves, each radar unit emits radio waves. Reflections from the emitted radio waves signals can be collected back at the radar units and processed to identify objects. Parking navigation can be repeated with several test drivers to achieve greater multiple hours (e.g., 20 or more hours) of driving data at nominal and off-nominal parking space driving speeds. Collected radar data can be compared with aerial data. The ground truth of the parking environment can be obtained at the same instance, and with the same space configurations consistent with the radar data collections. The ground truth data can be aerial imagery and can give a plan view of the parking environment from top-down.

A neural network can be designed with the raw radar detections (M points per instance) collected for T time instances, to give M×T input points (x,y). The output of the neural network can be a "spline" with N points (x,y), representing a smooth boundary of the parking space on the lateral side of the vehicle, repeated for both sides. The architecture of the neural network can be deep, for example, with multiple (7 or more) hidden layers. A loss layer can encompass a Euclidean type of loss to allow output akin to a regression output to represent continuous values in the x,y plane.

In some implementations, a trained model can be ported to an embedded platform, or similar, in a vehicle and can receive the radar detections as inputs. The outputs can be the "splines" which estimate the free spaces for a parking environment. Splines can move along with the vehicle, tracing the boundary of the parking spaces available essentially instantaneously as a moving input of T time instances is being processed.

Figure 2:
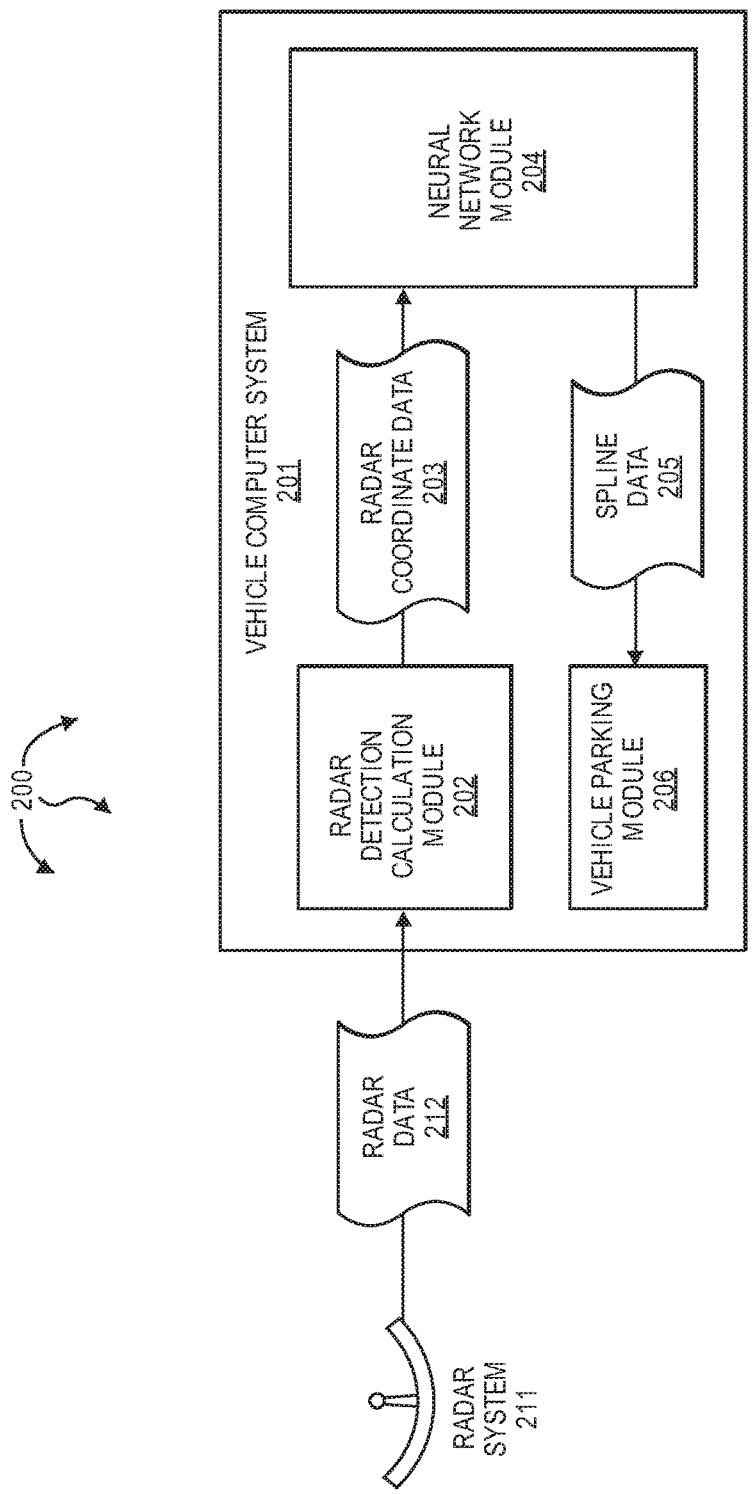
FIG. 2 illustrates an example computer architecture that facilitates detecting available parking spaces in a parking environment.

FIG. 2 illustrates an example computer architecture 200 that facilitates detecting available parking spaces in a parking environment. Computer architecture 200 can be contained within a vehicle, such as, for example, a car, a truck, a bus, or a motorcycle. Referring to FIG. 2, computer architecture 200 includes a vehicle computer system 201 and a radar system 211. Radar system 211 can include one or more radar units mounted to the vehicle. Radars units included in radar system 211 can be any of bistatic radar, continuous-wave radar, Doppler radar, fm-cw radar, monopulse radar, passive radar, planar array radar, pulse-doppler, synthetic aperture radar, etc. Each of vehicle computer system 201 and radar system 211, as well as their respective components can be connected to one another over (or be part of) a network, such as, for example, a PAN, a LAN, a WAN, a controller area network (CAN) bus, and even the Internet. Accordingly, each of vehicle computer system 201 and radar system 211, as well as any other connected computer systems and their components, can create message related data and exchange message related data (e.g., near field communication (NFC) payloads, Bluetooth packets, Internet Protocol (IP) datagrams and other higher layer protocols that utilize IP datagrams, such as, Transmission Control Protocol (TCP), Hypertext Transfer Protocol (HTTP), Simple Mail Transfer Protocol (SMTP), etc.) over the network.

In general, radar system 211 is configured to detect objects in a parking environment. For example, radar system 211 can capture raw radar data 212. Raw radar data 212 can include object detection data within a parking environment. Radar system 211 can include one or more radar units placed toward the front of the vehicle, toward the rear of the vehicle, or both.

As depicted, a vehicle computer system 201 includes a radar detection calculation module 202, a neural network module 204, and a vehicle parking module 206.

Radar detection calculation module 202 is configured to receive raw radar data 212 from radar system 211. Radar detection calculation module 202 can calculate radar coordinate data 203 (e.g., Cartesian coordinates) from raw radar data 212. Radar detection calculation module 202 is also configured to send radar coordinate data 203 to neural network module 204.

Neural network module 204 is configured to receive radar coordinate data 203 from radar detection calculation module 202 as an input. In general, neural network module 204 can receive and process radar coordinate data 203 to approximate parking space boundaries. Neural network module 204 can approximate parking space boundaries as splines by curve fitting the splines to the estimated parking space boundaries. Neural network module 204 is also configured to output spline data 205 to vehicle parking module 206.

Vehicle parking module 206 is configured to receive spline data 205 from neural network module 204. Vehicle parking module 206 can utilize spline data 205 to detect available parking spaces. Vehicle parking module 206 can also continually update the available parking space estimates by utilizing updated spline estimates as the vehicle navigates the parking environment.

Figure 3:
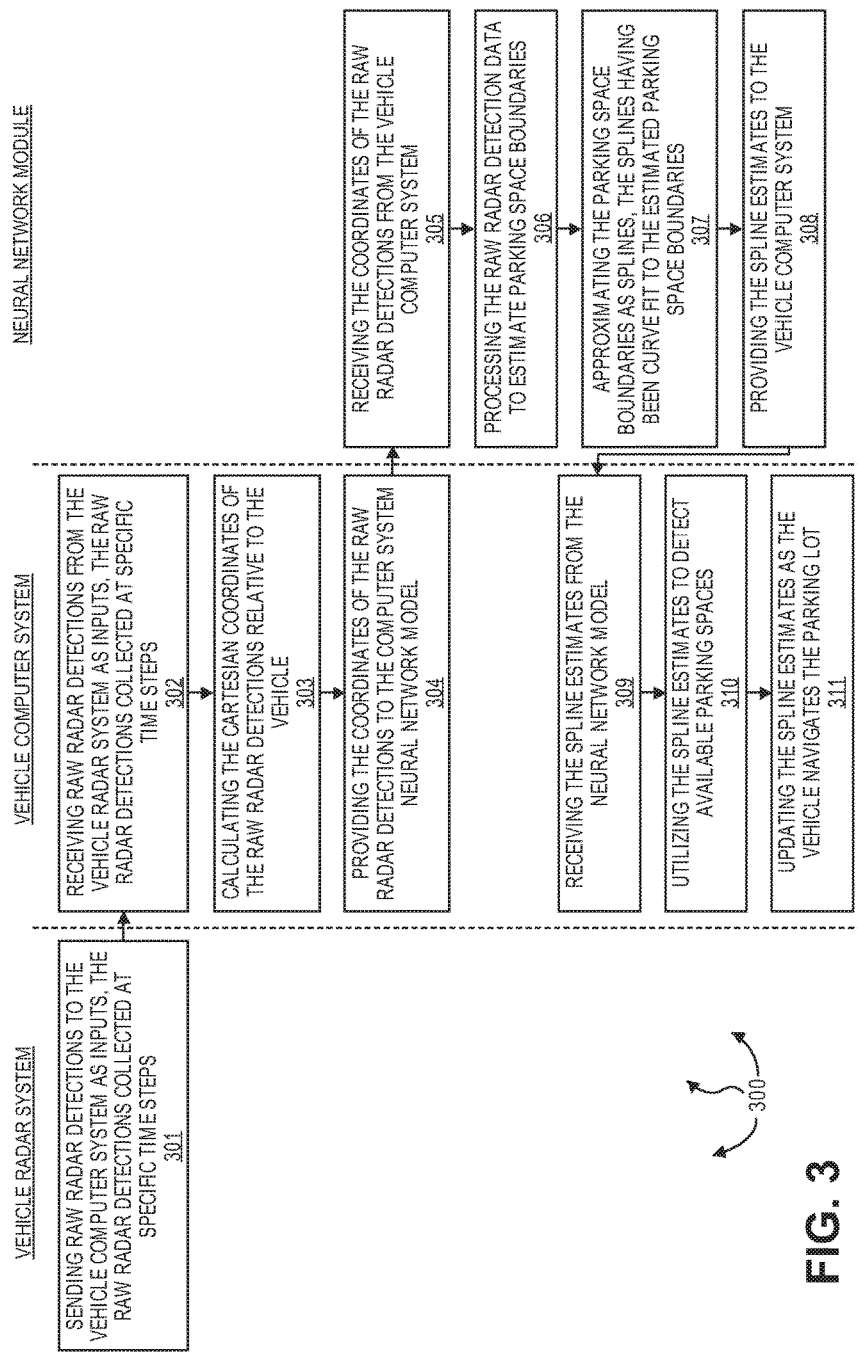
FIG. 3 illustrates a flow chart of an example method for detecting available parking spaces in a parking environment.

FIG. 3 illustrates a flow chart of an example method 300 for detecting available parking spaces in a parking environment. In the example of FIG. 3, the parking environment is a vehicle parking lot. Method 300 will be described with respect to the components and data of computer architecture 200.

Method 300 includes sending raw radar detections to the vehicle computer system as inputs, the raw radar detections collected at specific time steps (301). For example, radar system 211 can send radar data 212 to vehicle computer system 201. Radar system 211 can collect radar data 212 on an ongoing basis at specified time intervals T. Thus, as a vehicle is navigating a parking lot, radar system 211 can utilize radar technology to monitor the parking lot and to detect objects that are in the parking lot. The detected objects can be indicated in radar data 212. Detected objects can include: (1) vehicles that are in the parking lot, both parked and moving, (2) stationary objects, such as, for example, lamps, street lights, bollards, dividers, bicycle racks, shopping cart collection areas, shopping carts, traffic signs, store displays, fire hydrants, landscaping, etc., (3) moving objects, such as, for example, pedestrians, moving shopping carts, etc. and (4) spurious objects, such as, for example, debris, misplaced items, etc. Radar system 211 can transmit the object detections as raw radar data 212 to radar detection calculation module 202.

Method 300 includes receiving raw radar detections from the vehicle radar system as inputs, the raw radar detections collected at specific time steps (302). For example, radar detection calculation module 202 can receive raw radar data 212 from radar system 211.

Radar detection calculation module 202 can receive raw radar data 212 as M data points for each specified time interval T. As the vehicle navigates the parking lot, radar detection calculation module 202 can continually receive raw radar data 212 updates. Radar detection calculation module 202 can buffer M data points for each time step T, for example, storing a matrix of M×T input points in system memory. At each time step, raw radar data 212 can be approximated as a point cloud of radar reflections, the reflections indicating where objects are in the parking lot.

Method 300 includes calculating the Cartesian coordinates of the raw radar detections relative to the vehicle (303). For example, radar detection calculation module 202 can calculate radar coordinate data 203 (e.g., Cartesian coordinates) from radar data 212 relative to the vehicle. Radar coordinate data 203 can include estimates of the object locations contained within raw radar data 212 relative to the vehicle. Radar detection calculation module 202 can also project the object detection locations in 3D space to the plane of the vehicle in (x,y) space.

Method 300 includes providing the radar detection data to the computer system neural network module (304). For example, radar detection calculation module 202 can send radar coordinate data 203 to neural network module 204. Radar coordinate data 203 can include the processed radar data, including the (x,y) coordinates of the object detections, as well as portions of raw radar data 212 for further processing.

Method 300 includes receiving the radar detection data from the vehicle computer system (305). For example, neural network module 204 can receive radar coordinate data 203 from radar detection calculation module 202. Radar coordinate data 203 can include the processed radar data, including the (x,y) coordinates of the object detections, as well as portions of raw radar data 212 for further processing.

In one aspect, neural network module 204 includes a neural network architected in accordance with a multi-layer model. A multi-layer neural network model can include an input layer, a plurality of hidden layers, a loss layer, and an output layer. The loss layer can encompass a Euclidean type of loss to allow the output to be akin to a regression output representing continuous values in the (x,y) plane.

Method 300 includes processing the radar detection data to estimate parking space boundaries (306). For example, neural network module 204 can process radar coordinate data 203 to estimate parking space boundaries, such as, for example, as splines.

Prior to neural network module 204 being implemented in a production environment, neural network module 204 can be "trained" in a development environment. For example, neural network module 204 can be implemented in development vehicles with development vehicle computer systems and development radar systems. The development vehicles can be tested with multiple drivers in typical parking lot scenarios allowing the vehicles to navigate the parking lots looking for available parking spaces and gathering 10's or 100's of hours of test data. Aerial views of the parking lot scenarios can be recorded using overhead cameras, drones, aerial photography, satellite imagery, and the like. The aerial views taken at the same time as the radar data was collected can be overlaid on radar coordinate data 203 and output from neural network module 204 can be compared to the ground truth aerial imagery data. Neural network module 204 can be tuned such that neural network module 204 results are aligned with the ground truth aerial imagery data. As such, neural network module 204 can more accurately identify parking space boundaries in a production environment.

Additionally, neural network module 204 can be trained to filter out spurious radar data, also known as ghost objects, such as debris or shopping carts in the parking lot, fixed objects such as light fixtures, pedestrians, faulty radar artifacts such as unexpected reflections, etc.

When development results for neural network module 204 are satisfactory, the "trained" neural network module 204 can be implemented in a production environment and can provide more reliable parking space boundary estimates. The trained neural network module 204 can be ported to an embedded platform or similar in the vehicle and can receive the radar detections as inputs. The trained neural network module 204 can provide splines as outputs, where the splines estimate a free space in a parking lot.

Method 300 includes approximating the parking space boundaries as splines, the splines having been curve fit to the estimated parking space boundaries (307). For example, neural network module 204 can approximate radar coordinate data 203 as a spline with N points (x,y) representing the smooth boundary for the parking space on the lateral sides of the vehicle, repeated for both sides. Neural network module 204 can also approximate the parking space boundaries as splines by curve fitting the splines to the estimated parking space boundaries. Spline data 205 can include one or more spline estimates. Each spline estimate can include one, or more, of: a Bezier curve, a Hermite spline, a cubic spline, a b-spline, a non-uniform rational b-spline (NURB), a beta-spline, a v-spline, etc.

Method 300 includes providing the spline estimates to the vehicle computer system (308). For example, neural network module 204 can also provide spline data 205 the vehicle parking module 206. Method 300 includes receiving the spline estimates from the neural network model (309). For example, vehicle parking module 206 can receive spline data 205 from neural network module 204.

Method 300 includes utilizing the spline estimates to detect available parking spaces (310). For example, vehicle parking module 206 can receive spline data 205 from neural network module 204 and utilize the spline data 205 to detect available parking spaces. Method 300 includes updating the spline estimates as the vehicle navigates the parking lot (311). For example, vehicle parking module 206 can continually update the available parking space estimates by utilizing updated spline data as the vehicle navigates the parking lot.

Figure 4:
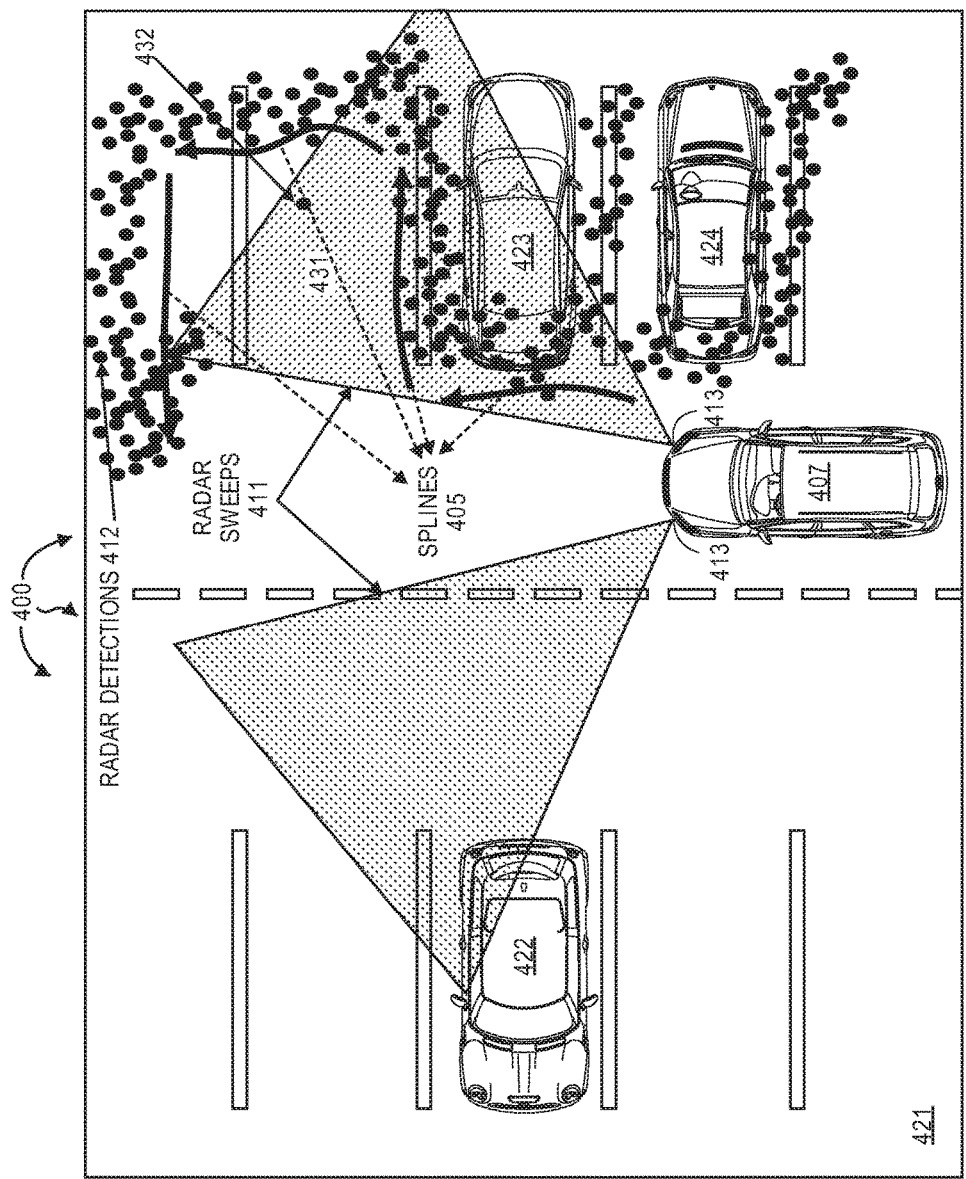
FIG. 4 illustrates an example parking environment.

FIG. 4 illustrates an example parking environment 400. As depicted, an example parking lot 421 contains three parked vehicles 422, 423, and 424. Parking lot 421 also contains a moving vehicle 407 which is in search of an available parking space. Moving vehicle 407 is equipped with radar sensors 413 (which may be the radar units of radar system 211) and a vehicle computer system (not shown).

Radar sensors 413 are configured to perform radar sweeps 411 and to detect objects in the parking lot as radar detections 412 (also referred to as "radar data"). Radar sensors 413 can provide radar detections 412 to the vehicle computer system for processing.

The vehicle computer system can process radar detections 412 and estimate the perimeter of the radar detections 412 as splines 405. Radar detections 412 can include spurious detection data 432 such as cans, or other debris, in the parking lot. The vehicle computer system can utilize neural network models (e.g., similar to neural network module 204) to differentiate between radar detection data 412 that is relevant data and radar detection data 412 that is spurious data.

The vehicle computer system 401 can use splines 405 to estimate available parking space(s) 431. As moving vehicle 407 navigates parking lot 421, radar sensors 413 can continue to perform radar sweeps 411 to update radar detections 412. The vehicle computer system 401 can process updated radar detections 412 to continually update splines 405.

Although the components and modules illustrated herein are shown and described in a particular arrangement, the arrangement of components and modules may be altered to process data in a different manner. In other embodiments, one or more additional components or modules may be added to the described systems, and one or more components or modules may be removed from the described systems. Alternate embodiments may combine two or more of the described components or modules into a single component or module.

The foregoing description has been presented for the purposes of illustration and description. It is not intended to be exhaustive or to limit the invention to the precise form disclosed. Many modifications and variations are possible in light of the above teaching. Further, it should be noted that any or all of the aforementioned alternate embodiments may be used in any combination desired to form additional hybrid embodiments of the invention.

Further, although specific embodiments of the invention have been described and illustrated, the invention is not to be limited to the specific forms or arrangements of parts so described and illustrated. The scope of the invention is to be defined by the claims appended hereto, any future claims submitted here and in different applications, and their equivalents.

What is claimed:

1. A method for controlling a vehicle and detecting available parking spaces in a parking environment, the method comprising:
    receiving radar data from one or more radar systems, the radar data comprising a three-dimensional point cloud of radar reflections during a time step;
    calculating coordinate data from the radar data by projecting points of the point cloud onto a two-dimensional plane of the vehicle;
    processing the coordinate data by a neural network to estimate parking space boundaries in the parking environment;
    calculating spline estimates for the parking space boundaries from the estimated parking space boundaries; and
    providing the spline estimates to a vehicle computer system.

2. The method of claim 1, wherein calculating spline estimates to the parking space boundaries comprises estimating one of: a Bezier curve, a Hermite spline, a cubic spline, a b-spline, a non-uniform rational b-spline (NURB), a beta-spline, a v-spline.

3. The method of claim 1, further comprising utilizing the spline estimates to detect available parking spaces.

4. The method of claim 1, further comprising updating the spline estimates as the vehicle navigates the parking environment.

5. The method of claim 1, wherein receiving radar data includes receiving radar data from the one or more radar systems at specified time intervals.

6. A method for controlling a vehicle and detecting available parking spaces in a parking environment, the method comprising:
    receiving, at a vehicle computer system, radar data from a vehicle radar system, the radar data collected at specific time intervals and including three-dimensional point clouds of radar reflections during the specific intervals;
    calculating Cartesian coordinates from the radar data relative to the vehicle by projecting points of the three-dimensional point clouds for the specific time intervals onto a two-dimensional plane of the vehicle;
    processing the radar data using a previously trained neural network to estimate parking space boundaries in the parking environment;
    approximating the parking space boundaries as splines, the splines having been curve fit to the estimated parking space boundaries;
    utilizing the splines to detect available parking spaces; and
    updating the splines as the vehicle navigates the parking environment.

7. The method of claim 6, wherein receiving radar data includes receiving radar data from two or more radar systems positioned toward the front of the vehicle.

8. The method of claim 6, wherein receiving radar data includes receiving radar data from radar systems positioned at multiple corners of the vehicle.

9. The method of claim 6, wherein calculating the Cartesian coordinates of the radar data relative to the vehicle comprises determining the coordinates of the radar data in the plane of the parking environment.

10. The method of claim 6, wherein processing the radar data using a previously trained neural network comprises utilizing a neural network model which has been trained and validated during previous proof of concept testing.

11. The method of claim 10, further comprising verifying the neural network model results against the ground truth of the parking environment at a specific instance utilizing the same space configurations consistent with the radar data collections.

12. The method claim 6, wherein processing the radar data using a previously trained neural network comprises utilizing a neural network architecture including a plurality of layers and including a loss layer.

13. The method claim 12, further comprising utilizing the neural network to identify a perimeter of radar data, the perimeter of radar data being utilized to estimate parking space boundaries.

14. The method of claim 6, wherein approximating the parking space boundaries as splines comprises estimating the parking space boundaries as one of: a Bezier curve, a Hermite spline, a cubic spline, a b-spline, a non-uniform rational b-spline (NURB), a beta-spline, or a v-spline.

15. The method of claim 6, wherein utilizing the splines to detect available parking spaces comprises providing the location of available parking spaces as defined by spline outlines.

16. The method of claim 6, wherein updating the splines as the vehicle navigates the parking lot comprises recalculating the splines based on updated radar data.

17. A system for detecting available parking spaces in a parking environment, the system comprising:
  system memory;
  a radar system associated with a vehicle;
  a previously trained neural network; and
  one or more processors configured to interact with the system memory, the radar system,
  and the previously trained neural network to:
    receive radar data from the radar system, the radar data collected at specific time intervals;
    calculate Cartesian coordinates in a three-dimensional space from the radar data relative to the vehicle;
    process the radar data to estimate parking space boundaries in the parking environment by projecting the Cartesian coordinates onto a two-dimensional plane to obtain two-dimensional coordinates and inputting the two-dimensional coordinates into a neural network module;
    approximate the parking space boundaries as splines, the splines having been curve fit to the estimated parking space boundaries;
    utilize the splines to detect available parking spaces; and
    update the splines as the vehicle navigates the parking environment.

18. The system of claim 17, wherein the one or more processors are configured to receive radar data form a plurality of radar units mounted on the vehicle.

19. The system of claim 17, wherein the one or more processors are further configured to identify a perimeter of radar data, the perimeter of radar data being utilized to estimate parking space boundaries.

20. The system of claim 17, wherein the one or more processors are configured to estimate the parking space boundaries as one of: a Bezier curve, a Hermite spline, a cubic spline, a b-spline, a non-uniform rational b-spline (NURB), a beta-spline, or a v-spline.

* * * * *